United States Patent [19]

Ho et al.

[11] 3,893,080

[45] July 1, 1975

[54] MINUTIAE RECOGNITION SYSTEM

[75] Inventors: Allen P. Ho; Hua-Tung Lee, both of Poughkeepsie, N.Y.

[73] Assignee: International Business Machines Corporation, Armonk, N.Y.

[22] Filed: June 29, 1973

[21] Appl. No.: 375,211

[52] U.S. Cl. ................ 340/146.3 E; 340/146.3 MA

[51] Int. Cl.² .......................................... G06K 9/12

[58] Field of Search .......... 340/146.3 E, 146.3 MA, 340/146.3 AC, 146.3 R, 146.3, 172.5; 356/71

[56] References Cited

UNITED STATES PATENTS

| | | | |
|---|---|---|---|
| 3,537,070 | 10/1970 | Malek | 340/146.3 E |
| 3,588,818 | 6/1971 | Cogleton et al. | 340/146.3 MA |
| 3,593,283 | 7/1971 | Miyamoto et al. | 340/146.3 MA |
| 3,613,080 | 10/1971 | Angeloni et al. | 340/146.3 MA |
| 3,638,188 | 1/1972 | Pincoffs | 340/146.3 AC |
| 3,699,519 | 10/1972 | Campbell | 340/146.3 E |

*Primary Examiner*—Leo H. Boudreau
*Attorney, Agent, or Firm*—Thomas F. Galvin

[57] ABSTRACT

A system for detecting bifurcations and ridge endings (minutiae) in a fingerprint or on similar patterns in which two lines merge into one. The print is optically scanned, converted into electrical signals and entered into a novel continuity logic network. The presence of a bifurcation in the network results in three distinct outputs on the periphery of the network from at least two sides. The split in the bifurcation may also be detected by reversing the polarity of the electrical signals and detecting a single output. Means are also provided for ensuring that a single bifurcation is detected only once. Ridge endings are treated as reverse-polarity bifurcations and can be detected by the same system elements.

35 Claims, 13 Drawing Figures

MINUTIAE RECOGNITION SYSTEM

CROSS REFERENCE TO A RELATED APPLICATION

This application is related to application Ser. No. 375,191 filed on June 29, 1973 in the names of Allen P. Ho and Yee-Ming Ting and assigned to the same assignee as the present application.

BACKGROUND OF THE INVENTION

1. Field of the Invention

This invention relates to the detection of the merger of lines in a pattern of lines and spaces. More particularly, the invention relates to the detection of minutiae in a fingerprint.

2. Description of the Prior Art

The importance of accurate and automated fingerprint identification and verification requires no extended discussion. Law enforcement agencies such as the Federal Bureau of Investigation have been encouraging and soliciting the electronics industry to develop an automatic fingerprint identification processor. The broad details of such a processing system are well known and many facets of such a system are well within today's technology. The most widely accepted system comprises optically scanning a fingerprint or a transparency thereof, converting it into electrical signals, detecting and storing the unique characteristics of the given fingerprint whereby it may be compared to information already in storage and the results of the comparison retrieved from storage for identification or verification purposes.

Within the last few years, many researchers in this field have settled on the detection and location of ridge endings and bifurcations in the fingerprint as the most likely way to succeed. It has been demonstrated that these so-called minutiae afford positive identification. In practice, minutiae recognition is quite difficult. The primary difficulty is that the quality of the fingerprints varies greatly in contrast and clarity. In addition, the width of the ridges and the valleys, i.e., the distance between ridge centers, varies widely. Various proposals to solve this problem have been suggested and many have been implemented with varying degrees of success. Many of these systems appear in the patent literature and are familiar to those of skill in the art. Hence extended discussion is deemed unnecessary. Suffice it to say that to our knowledge none of the prior art systems have been used successfully in field operations of law enforcement agencies or by others who would use such a system, as for example, issuers of credit cards.

SUMMARY OF THE INVENTION

It is therefore an object of the present invention to improve the recognition of minutiae in patterns such as fingerprints.

It is another object of this invention to do so efficiently, using electronic equipment and circuits which are commercially available.

These and other objects and advantages are provided by impressing digital electrical representations of areas of the fingerprint on a first continuity logic network which affords positive and reliable means for recognizing bifurcations and ridge endings. For a bifurcation, the network generates three positive output signals the relative position of which with respect to the entire fingerprint can then be stored in a suitable storage device.

Ridge endings may be detected by inverting the input signals from the print. This reversal causes the network to also generate a positive output signal for a ridge ending.

In the preferred embodiment of the invention, a second continuity logic network is provided which has impressed thereon the reversal of the electrical signals to detect the split in the bifurcation or the area around the ridge endings.

Alternatively, by suitable timing, a single continuity logic network could be used to perform both functions.

Means are also provided to inhibit the recognition of false minutiae and from recognizing the same minutiae twice.

The present system is applicable generally to the identification of any pattern which consists of contrasting lines and spaces and where two lines merge into one. For example, the testing and classification of conductive lines on printed circuits could also be accomplished with the present invention. The conductive lines are highly reflective in comparison with the substrate on which the lines are deposited.

DESCRIPTION OF THE PREFERRED EMBODIMENT

The following description is with respect to the detection of bifurcations and splits in bifurcations only. A bifurcation is the merger of two ridges into a single ridge. A ridge ending is the termination of a ridge in the fingerprint and appears as a negative of a bifurcation. Therefore, the present system can be used to detect ridge endings merely by inverting the polarity of the video signals. Therefore, a detailed discussion of the system with respect to bifurcations is all that is necessary to encompass minutiae description in general.

Figure 1:
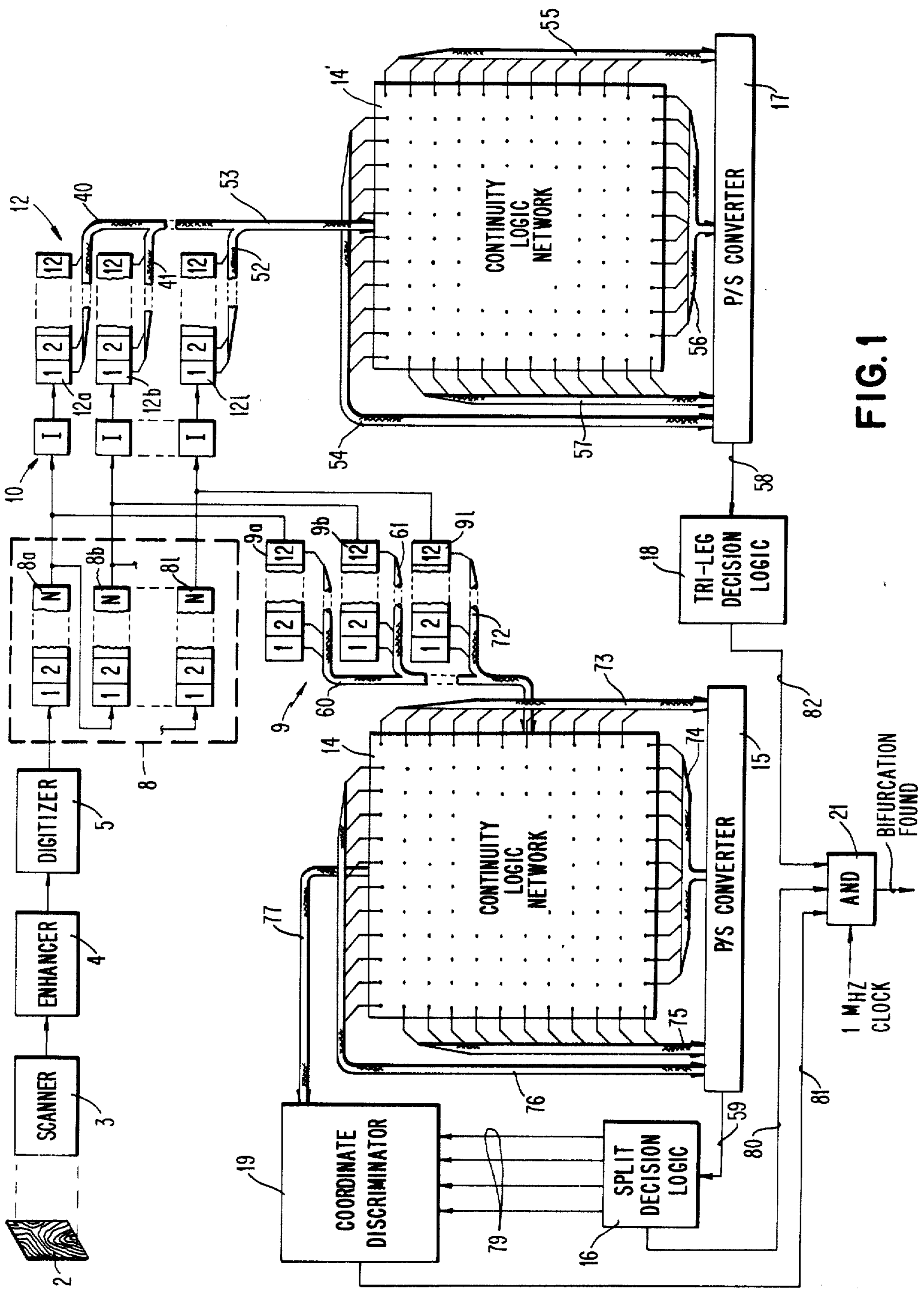
FIG. 1 is a block diagram of the preferred embodiment of a bifurcation recognition system.

With reference to the overall system illustrated in FIG. 1, a fingerprint 2, which is suitably illuminated, is scanned by scanner 3 which generates video signals representative of the ridges and spaces within fingerprint 2. The analog signals are transmitted to enhancer 4 before being converted to binary signals by digitizer 5.

The elements just described have been used in various fingerprint systems and comprise no part of the present invention. Fingerprint 2 may be an actual print impressed on a prism or may be a transparency of a print suitably illuminated so that it can be scanned by scanner 3 which typically would be a flying spot scanner, a TV camera or vidicon, all of which are commercially available to generate a video signal. Enhancer 4 acts as a ridge-valley filter to accentuate the difference in contrast between the ridges of the print and the valleys between the ridges. Various types of enhancement techniques could be used for taking into account the gradual gradations in lighting over the surface of the fingerprint. One such circuit is described by W. K. Rackl in a publication entitled "Dynamic Threshold Circuit", IBM Technical Disclosure Bulletin Volume 15 No. 4 September 1972 pp. 1138–1139. Other enhancement techniques for filling in small breaks in ridges, separating blurred valleys and editing blank or heavily smeared areas have also been developed. These techniques may be applied to the transparency of the print itself prior to entry into the recognition system or in an on-line device as illustrated.

The analog signal indicative of the pattern at a selected position on the print is quantized into binary signals by digitizer 5. Digitizer 5 is preferably an Analog-Digital Converter of standard design capable of sampling the video signal at a 1 MHz rate resulting in a matrix of 350 × 262 points representative of print 2. The binary signals are then transmitted to temporary memory 8 which comprises a pluality of digital shift registers 8A, 8B, . . . 8L accessed in parallel. In the present embodiment each shift register has $N = 350$ individual locations and there are twelve such shift registers, thereby providing temporary storage for 4200 bits of information at any given instant, or twelve video lines.

After the 4200 bits of information have been stored in temporary storage 8 they are transmitted seriatim to a set of 12-bit shift registers 9 and through inverters 10 to a corresponding set of 12-bit shift registers 12.

Each set of shift registers 9 and 12 comprise twelve individual shift registers, thereby providing simultaneous indications of 144 bits of information to continuity logic networks 14 and 14', respectively.

Networks 14 and 14' will be described in greater detail in later sections of this specification. In general, they serve as storage means for the binary representations of a particular section of fingerprint 2 which has been scanned and digitized. It is from this binary representation that the detection of a bifurcation in electrical form is accomplished.

The periphery of networks 14 and 14' have output lines connected to the inputs of parallel-to-serial converters 15 and 17, respectively. Thus, the periphery of network 14 which in a 12 × 12 matrix, comprises 44 circuits, are connected to converter 15 through cables 73, 74, 75 and 76 as indicated in FIG. 1. Similarly, the 44 peripheral circuits of matrix 14' are connected to the inputs of converter 17 through cables 54, 55, 56 and 57. Converters 15 and 17 are clocked at 44 MHz to synchronize their operation with the rest of the system.

Network 14' indicates whether there are three legs of a bifurcation present. The peripheral outputs stored in converter 17 are transmitted to a TRI-LEG decision logic circuit 18 which determines the existence of three legs. A positive output from logic circuit 18 via connection 82 is transmitted to AND circuit 21.

Network 14 serves to identify the split in the bifurcation noted in network 14'. SPLIT decision logic circuit 16 generates a positive output on concentration 80 to AND circuit 21 if a split is found.

Certain of the circuits at the center of network 14 have outputs on cable 77 to COORDINATE DISCRIMINATION 19. In addition, outputs 79 from logic circuit 16 have inputs to discriminator 19. As will be more fully described in a later section of this specification, discriminator 19 serves to block the recognition of the same bifurcation more than once. The output from discriminator 19 is also transmitted to AND circuit 21 through connection 81. The coincidence of outputs from logic circuits 18, 16 and 19 at AND gate 21 generate an output indicative of a bifurcation.

When the criteria of a bifurcation are satisfied, the coordinates of this point on the fingerprint are stored in a suitable memory (not shown). In addition, the point may be superimposed on a bright spot on the print as viewed from a TV monitor.

Figure 2:
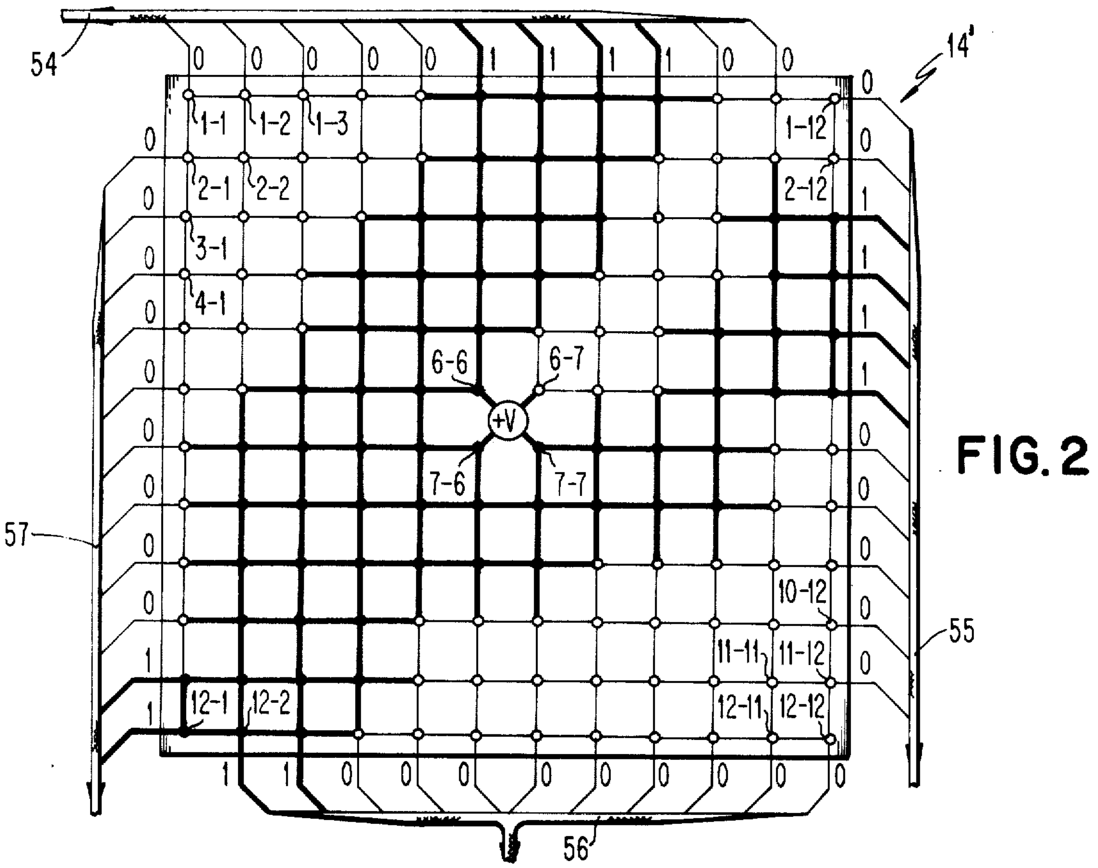
FIGS. 2 and 3 are illustrations of the continuity logic network 14 and 14' each respectively having electrical representations of a bifurcation and of a split impressed thereon.

FIG. 2 illustrates the presence of an exemplary bifurcation which is impressed on continuity logic network 14'. Network 14' comprises a source of potential, +V, at the center of a 12 × 12 matrix. The +V source functions as a continuity signal. Each matrix point is a logic circuit which functions to generate an output upon the coincidence of a signal from its corresponding storage location in shift register 12 and a signal from one of the four matrix points located adjacent and orthogonal to it. For example, an input to circuit 5-4 of network 14' from its associated position in the shift register array 12 plus an input received from either one of circuits 5-3, 5–5, 4—4, or 6-4 causes circuit 5-4 to generate an output. In similar fashion, peripheral circuit 1-2 is associated with three circuits: 1—1, 1-3 and 2—2. An output signal from one such circuit is transmitted to the inputs of the adjacent, orthogonal matrix points. Thus, there is a two-way path between a circuit at any given matrix point and its adjacent, orthogonal circuits, whereby any such circuit can energize or become energized by the adjacent, orthogonal circuits in conjunction with signals received from shift registers 12.

As illustrated by the heavy shaded lines in FIG. 2, a bifurcation is represented by three distinct sets of grouped output signals from the +V source to the periphery of the matrix. A continuous output from +V to one of the peripheral output lines is indicated by a logical '1' in FIG. 2; and the output which is not connected to the +V source is indicated by a logical '0'. Only a single such conductive path from +V to the periphery is necessary to constitute a leg of a bifurcation. The logical 0 signals on the periphery serve to separate the individual legs of the bifurcation. For a continuity path to be established, it is necessary that at least one of four elements 6—6, 6-7, 7-6 or 7—7 receive a signal from shift register 12.

Figure 3:
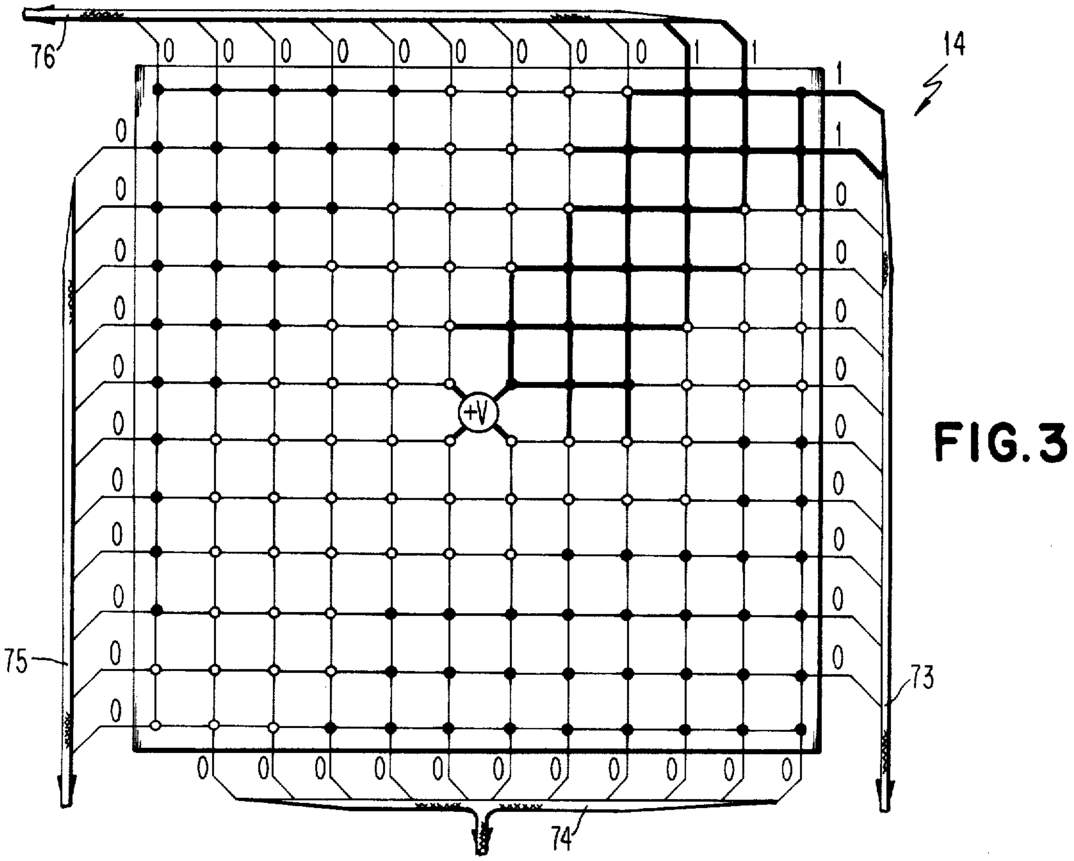

FIG. 3 illustrates an exemplary illustration of the split in the bifurcation illustrated in FIG. 2. As previously noted with respect to FIG. 1 the binary signals from the print are transmitted to network 14 in their 'true' (logical 1) form whereas the signals transmitted to network 14' are inverted (logical 0). The legs of a bifurcation on a fingerprint appear as blank or white video dots and the split appears as a black video dot, the latter being represented by a logical 1 in the system.

As shown in heavy lines in FIG. 3, the split in the bifurcation is represented by a single set of grouped output potentials from +V to the periphery of the matrix. As with the bifurcations in FIG. 2, it is necessary that a continuity exist from the center of the matrix having the potential of +V to the periphery without any open connections for the split to be detected. Thus, there are other points in the matrix which receive signals from their corresponding storage locations in shift registers 9 such as point 1—1; but no output will be generated at the periphery of the matrix because there is not continuous conductive path from the potential source +V to that point.

The recognition of both the bifurcation as well as the split in the bifurcation is necessary due to the noise level caused by the video portion of the system. Without the noise problem only matrix 14' would be necessary.

An alternate technique for determining the existence of the three legs and the split in the bifurcation is to use an alternate-polarity system. In such a system, a polarity control gate would be inserted between temporary memory 8 and shift registers 9. Network 14' shift registers 12 and inverters 10 would be eliminated. However, this type of system requires that the polarity of the video signal change with each video line, increasing the complexity of the system.

Figure 4:
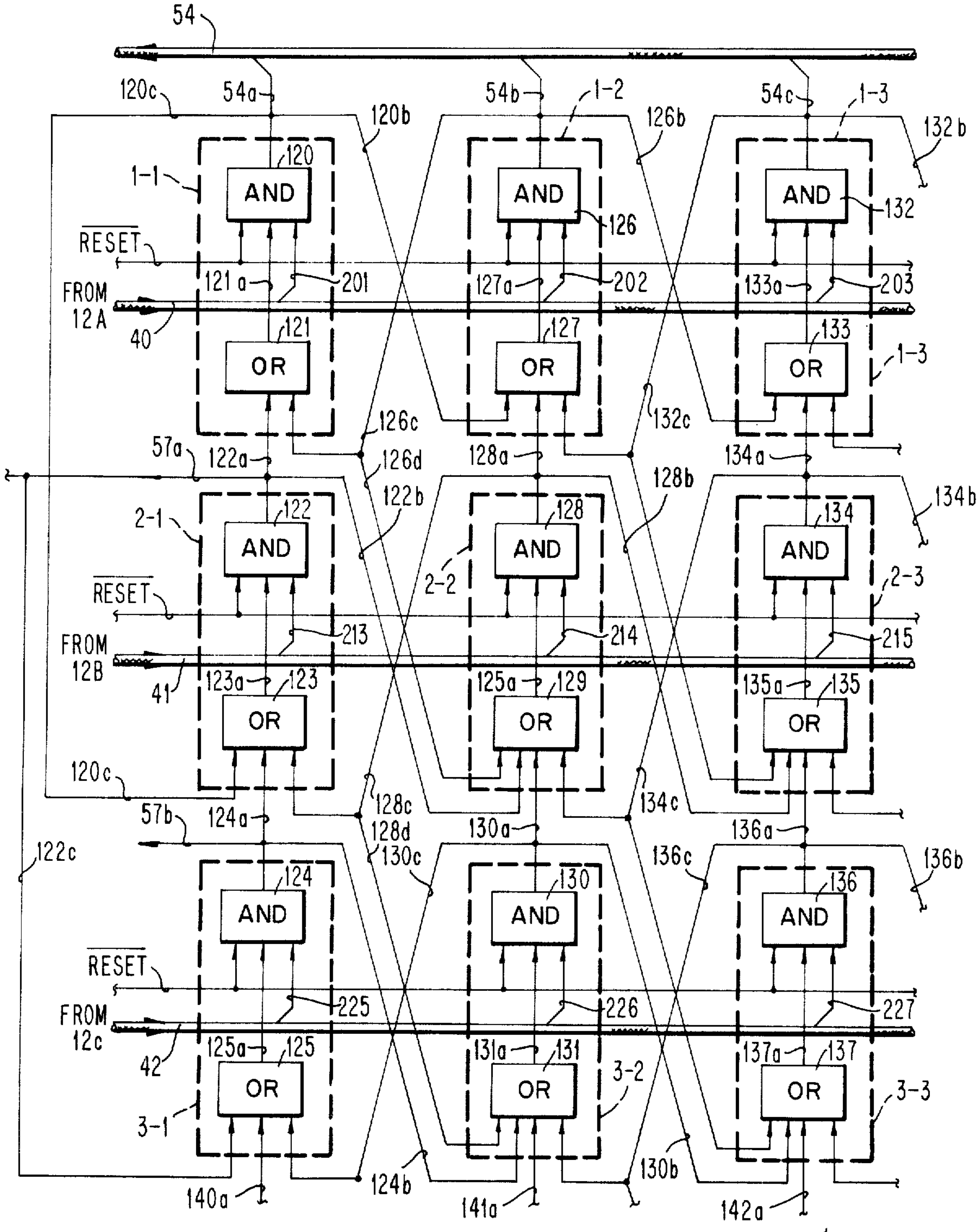
FIG. 4 is an electrical circuit diagram illustrating the detailed construction of individual points in networks 14 and 14'.
Figure 4:
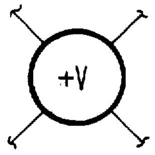

Turning now to FIG. 4 there is shown a submatrix of logic gates which comprise the matrix of logic networks 14 and 14'. Each circuit enclosed by dotted lines corresponds to one element in the matrix. Referring to circuit 1—1 as being exemplary of the 144 circuits in a 12 × 12 matrix, it comprises AND gate 120 having a pair of inputs 201 and 121*a* plus a $\overline{\text{reset}}$ input. Wire 201 emanates from storage location 1 in shift register 9A of the shift register array 9. Input connection 121*a* is the output from OR gate 121. The $\overline{\text{reset}}$ line is ordinarily at a logical 1 level during the gating time and is actuated in conjunction with all other $\overline{\text{reset}}$ lines so as to clear the matrix between cycles. The inputs to OR gate 129 are received from teh outputs of the AND gates of the circuits which are adjacent and orthogonally located with respect to circuit 2—2, i.e., 1-2, 2-1, 3-2 and 2-3. In similar fashion the single output form AND gate 128 is connected to the inputs of each of four adjacent and orthogonally placed logic circuits. Thus, in general, each circuit in continuity logic network 14 and 14' both: (1) addresses and (2) is addressed by the four circuits associated with it.

An understanding of the operation of the circuit in FIG. 4 results in a better understanding of the operation of networks 14 and 14'. Assume that logical 1 signals are stored in the locations of shift register 12 associated with circuits 1-2, 2—2, 2-3 and 3—3. Logical 0 signals are stored at the shift register locations associated with the remaining circuits 1—1, 1-3, 2-1, 3-1, and 3-2 in the submatrix. If other circuits in the matrix are energized such that the potential source +V is propagated to line 142*a*, then a logical 1 (+V) will be generated on line 54*b*at the periphery of the matrix. Because line 142*a* is at a 1 level, the output line 137*a* of OR gate 137 is also at a 1 level. Input 227 is at a 1 level as previously indicated; AND gate 136 generates a logical 1 output. A logical 1 output from gate 136 is fed via lines 136*a* and 136*c* to the inputs of circuits 2-3 and 3-2, respectively. However, only circuit 2-3 can generate an output because the AND gate 130 is rendered inactive due to the logical 0 signals on lines 226. The logical 1 signal on line 136*a* is gated through OR circuit 135 on line 135*a* to generate a logical 1 in conjunction with the logical 1 on input 215 from AND gate 134.

Circuit 2—2 is gated in similar fashion so that the signal on lne 128*a* is a logical 1. This signal then gates circuit 1-2 to generate an output at peripheral connection 54*b*. No outpus are generated on the other peripheral lines.

Figure 5:
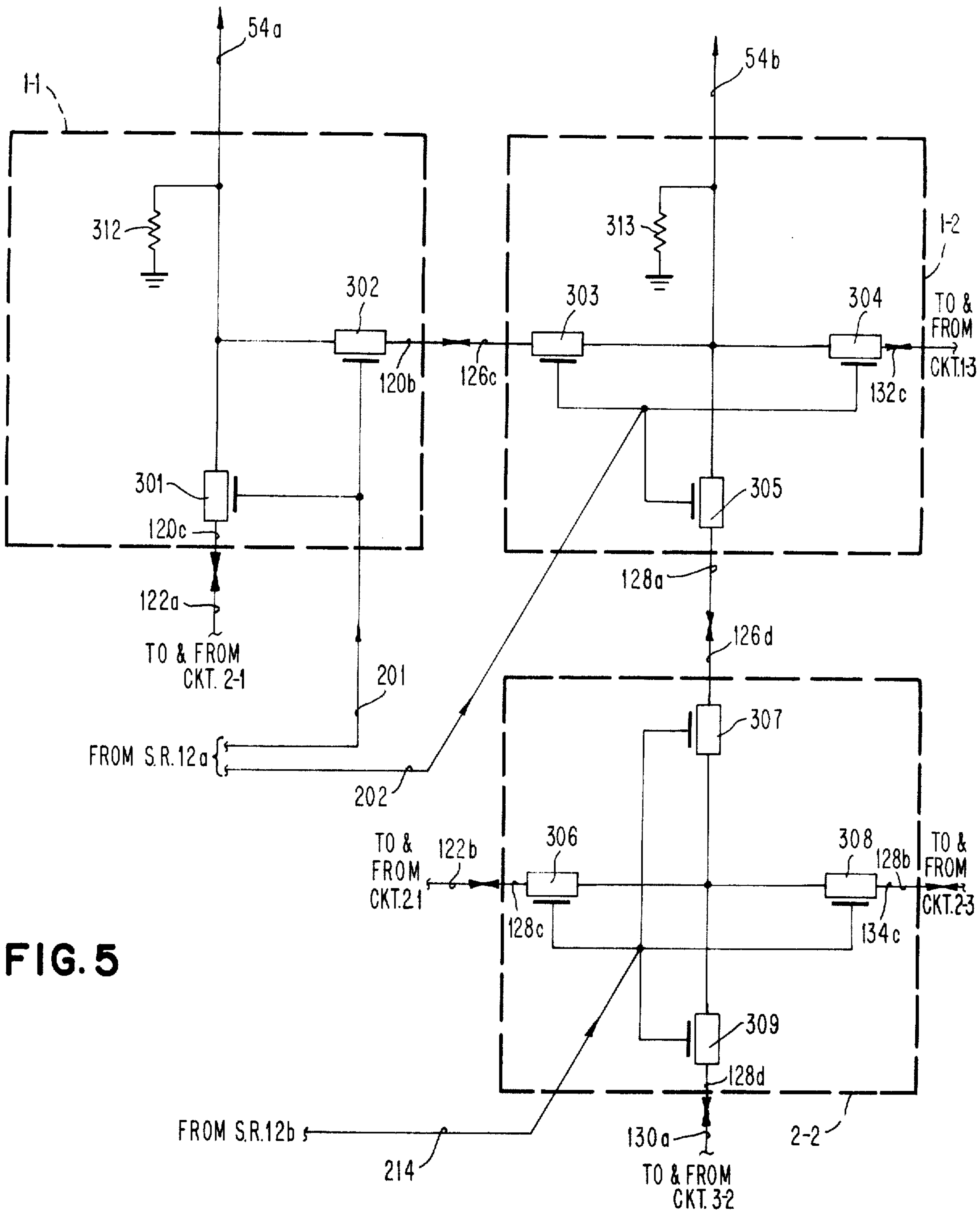
FIG. 5 is an illustration of the circuit diagram in FIG. 4 comprising field effect transistors.

FIG. 5 illustrates the circuits which comprise the continuity logic network fabricated in the form of field effect transistors. Field effect transistors are chosen as the preferred embodiment of these matrix circuit elements because of their relatively small cost, ease of fabrication in integrated circuit form and noise immunity. It will be clear to those of skill in this art that other types of circuits could be used to perform the same function. For example, bipolar transistors configured as TTL circuits or current switch emitter follower circuits can perform the same functions. At the present state of the art he configuration of these circuits into AND and OR gates are quite well known and no further description is required.

For brevity and ease of illustration, only circuits 1—1, 1-2 and 2—2 are illustrated in FIG. 5. All of the remaining circuits in the matrix would be constructed in the same fashion as one of these circuits and further illustration would be redundant.

Upon examination of FIG. 5, it will be readily apparent that the field effect transistors in each circuit element have a common input line at their gate electrodes. For purposes of the present system, the field effect transistors are enhancement mode N channel devices and the standard terminology of gate, source and drain is used for descriptive purposes. As is well known to those of skill in the art, the difference between the source and drain of modern field effect transistors does not lie in the structure of the transistor itself but merely in the manner of biasing. In N channel device terminology the source is generally connected to the positive bias and the drain is generally connected to a lower potential.

The correlation between the field effect transistor circuit in FIG. 5 and the logic circuit of FIG. 4 can be appreciated by referring specifically, for example, to circuit 2—2, as this represents the most complicated circuit in the matrix of logic circuits which comprises the continuity logic network.

The numbered inputs to OR gate 129 in FIG. 4 correspond to the identically numbered inputs to the source regions of transistors 306, 307, 308, and 309. The numbered outputs from AND gate 128 in FIG. 4 also correspond to the identically nubered outputs from the source regions. Thus the source regions form a two way link between associated circuits.

There is one field effect transistor for each circuit which is associated with the circuit under consideration. Thus, circuit 2—2, which has four circuits located adjacent and orthogonally with respect to it, contains four field effect transistors; whereas circuits 1-2 and 1—1 contain three and two field effect transistors respectively because of their positions at the periphery of the matrix. The outputs at the periphery are taken from the common drain connections at circuits 1—1 and 1-2 through load resistors 312 and 313, respectively, which have values of around 500 ohms. The resistors function to prevent the drain nodes from floating. In the operation of circuit 2—2, a positive signal from shift register 12*b* on line 214 gates FET's 306-309. A positive continuity signal +V from one of the associated circuits 2-1, 1-2, 2-3 or 3-2 is then gated through the source of the associated FET 306, 307, 308 or 309, respectively. This signal is then available at the other FET sources to energize other circuits associated with circuit 2—2. If a signal is received by circuit 1-2 on line 202, the continuity signal form the +V continuity source appears at line 54*b* to be detected by logic circuit 18.

The FET configuration in FIG. 5 requires amplifier circuits at selected locations in the matrix to boost the signal level. However, their inclusion is a matter of design choice and is omitted for ease of illustration.

Figure 6:
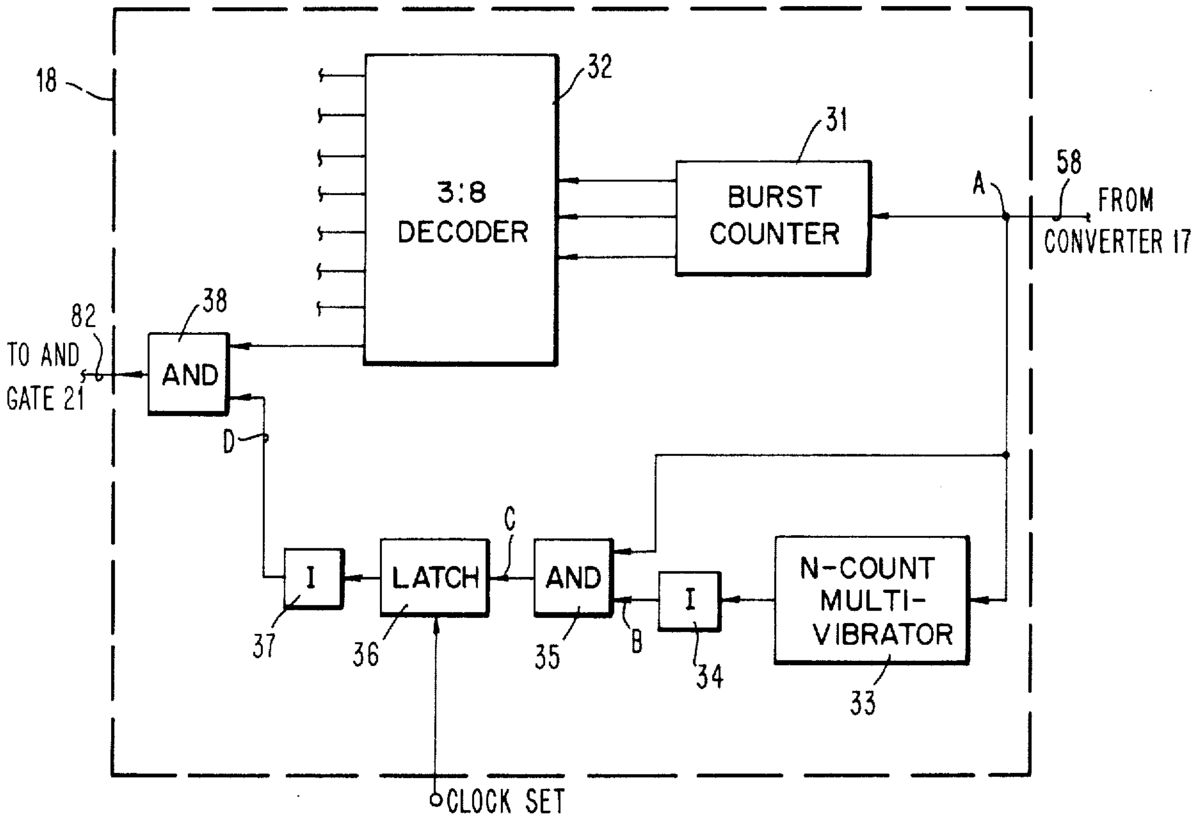
FIG. 6 is a detailed diagram of tri-leg decision logic circuit 18.
Figure 7:
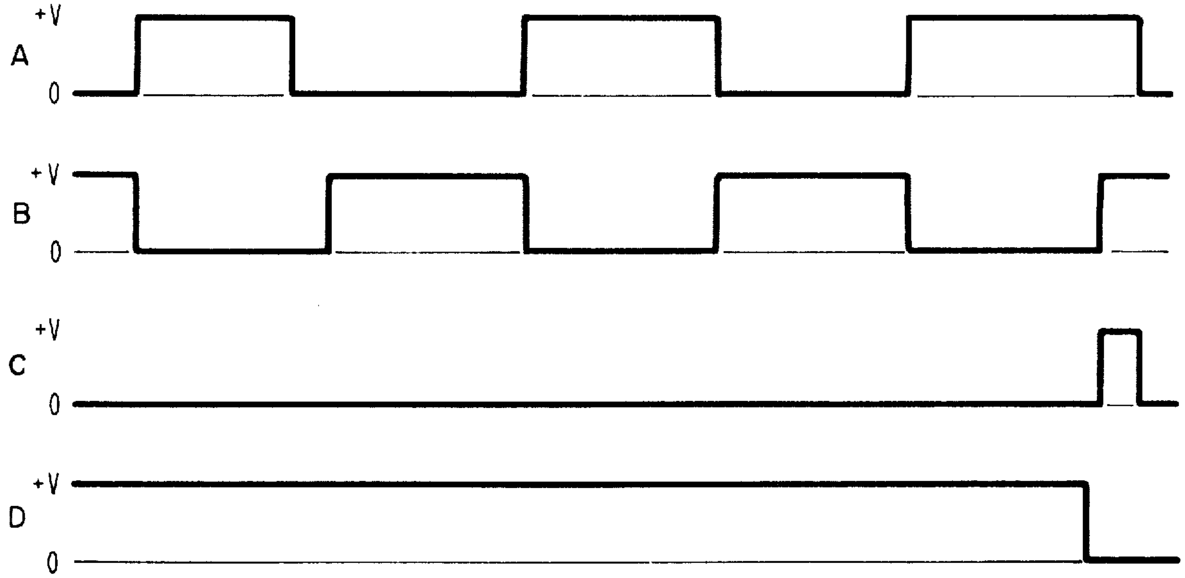
FIG. 7 is a timing diagram illustrating the timing relationship of pertinent signals within logic block 18.

Turning now to FIGS. 6 and 7, TRI-LEG decision logic circuit 18 is shown in more detail in conjunction with a timing diagram of waveforms generated within the circuit responsive to the outputs from continuity logic network 14'. As previously discussed, a bifurcation superimposed on network 14' generates a set of three distinct groups of logical 1 output signals. Each such group is separated by at least one logical 0 signal.

Circuit 18 performs two functions. Primarily it functions as a means for generating an output at line 82 indicative of the indentification of three and only three distinct groups of signals indicative of a bifurcation. In addition, circuit 18 operates to reject any set of three groups in which any single group of signals contains more than a predetermined number of logical 1 signals. This latter function is a noise check to eliminate the results of a blurred impression or other imperfections generated from network 14'.

The primary three-leg identificatin function is performed by burst counter 31 and decoder 32. Counter 31 generates outputs in binary coded decimal form depending on the number of group signals received from converter 17. Decoder 32 is responsive to the outputs from burst counter 31 and has a single operative output line which generates an output signal only upon the incidence a signal indicative of three groups of signals.

The aforementioned rejection feature is performed by N-count multivibrator 33 and gating elements which comprise inverters 34 and 37, AND gate 35 and latch 36. In the present embodiment it is desired to reject a set in which any group contains more than five pulses. The cycle time of decision circuit 18 is sufficiently ling to receive the 44 signals contained in converter 17 which stores the outputs of the periphery of network 14' and transmits the pulses in serial fashion along line 58 to logic circuit 18. Thus a CLOCK SET line is provided at latch 36 to reset circuit 18 after 44 cycles. Converter 15 must be designed to operate at a much faster rate than the remainder of the system. In the preferred embodiment, the system clock operates at a 1 MHz rate and converter 15 operates at a 44 MHz rate.

It is noted at this point that each of the circuits illustrated in block 18 is well known to those of skill in the art and commercially available. The operation of the reject circuitry is illustrated by way of example in FIG. 7. A set of three groups of signals is transmitted form converter 17 to decision circuit 18. The groups contain four, five and six pulses respectively. As previously mentioned, it is desired to ignore more than five pulses in any group; therefore N-count multivibrator 36 is set to $N = 5$. Upon the receipt of a first pulse in the first group, multivibrator 33 generates five pulses irrespective of the number of pulses in the group at node A. Inverter 34 inverts the signal from multivibrator 33 as shown at node B. Because node B is at a down, or logical 0 level, AND gate 35 generates a down level output at node C, thereby holding latch 36 to a negative level. The negative level of latch 36 is inverted at inverter 38 to a true or logical 1 level. Upon the receipt of an indication of three distinct groups from decoder 32, AND gate 38 is activated and generates a logical 1 signal on line 82 during the clock cycle.

As shown in FIG. 7 a similar action occurs for the second group which consists of five signals from converter 17. The third group of pulses, however, contains six pulses which is more than the maximum allowed. In this event there is a coincidence of logical 1 signals at AND gate 35, thereby setting latch 36 to an up or logical 1 level. Inverter 37 inverts the signal to a down level or logical 0, causing the output from AND gate 38 to become a logical 0 during the 1 microsecond clock cycle. This causes the output on line 82 to AND gate 21 to be a logical 0 and results in the rejection of the false impression of a bifurcation.

A Decision at gate 21 is made only at the end of each 44 subcycles. Hence, the set of pulses from converter 17 would be rejected in toto.

Figure 8:
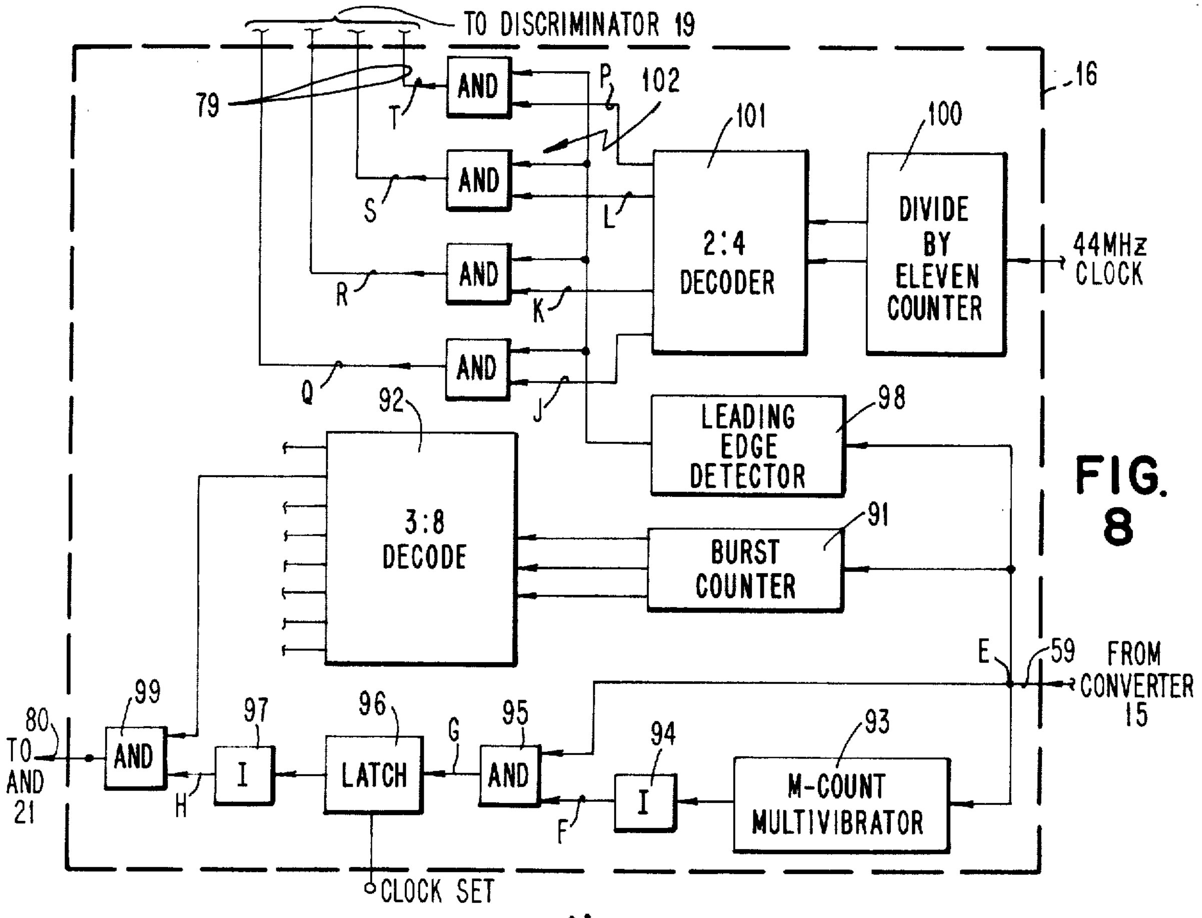
FIG. 8 is a detailed diagram of split decision logic block 16 illustrated in FIG. 1.
Figure 9:
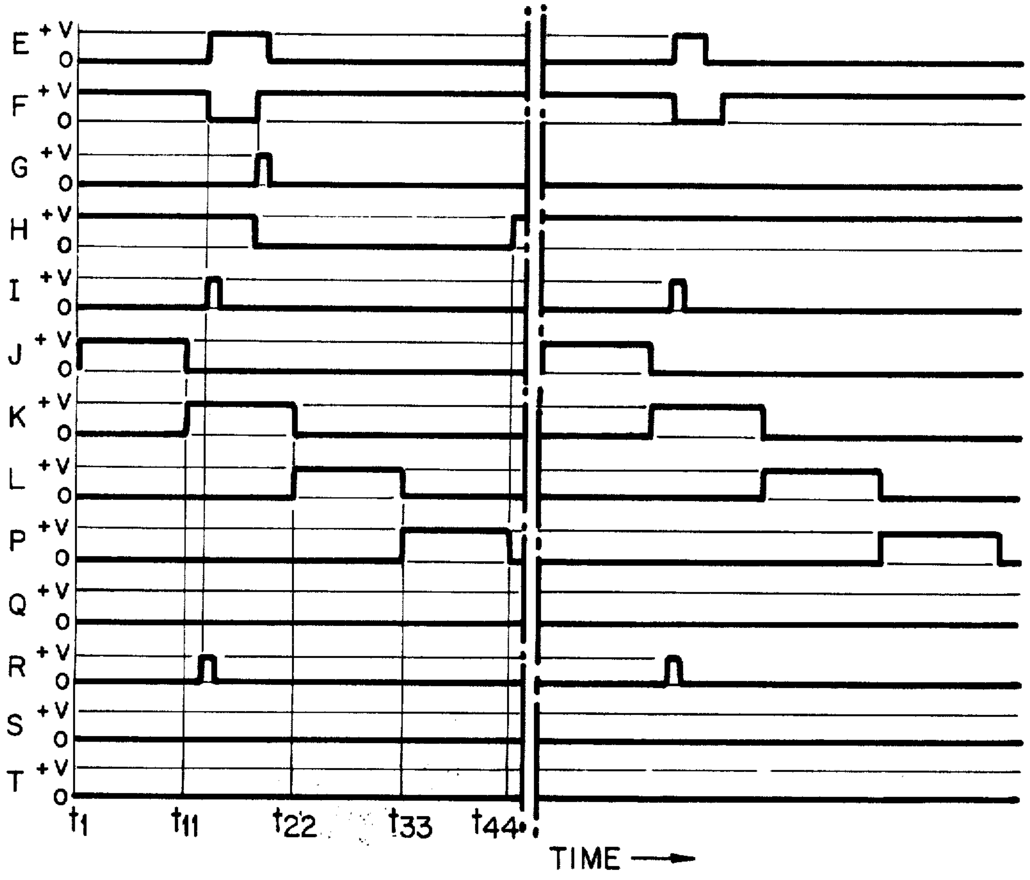
FIG. 9 is a timing diagram illustrating the timing relationship of pertinent signals within logic block 16.

Referring now to FIGS. 8 and 9, SPLIT decision logic circuit 16 is illustrated in conjunction with a timing diagram of wave forms generated within the circuit responsive to the outputs from continuity logic network 14. Network 14 generates one distinct group of logical 1 output signals in response to a split of a bifurcation superimposed thereon. The group of logical 1 signals is preceded and followed by logical 0 signals.

Circiut 16 performs three functions, two of which are quite similar to that of circuit 18 previously discussed. Circuit 16 functions as a means for generating an output at line 80 indicative of the indentification of one, and only one, distinct groups of signals indicative of a split in a bifurcation. Secondly, circuit 16 operates to reject this group if it contains more than a predetermined number of logical 1 signals. Thirdly, the circuit functions to identify the particular quadrant of the periphery of matrix 14 from which the first signal in the group emanates.

The single leg identification function is performed by burst counter 91 and decoder 92. Counter 91 generates an output in binary coded decimal form indicative of the number of groups of signals received from converter 15. Decoder 92 is responsive to outputs from burst counter 91. It has a single operative output line which generates an output signal only upon the incidence of a signal indicative of one group of signals.

The rejection feature is perfomed by M-count multivibrator 93 and gating elements which comprise inverters 94 and 97, AND gate 95 and latch 96. In the present embodiment it is desired to reject a group of signals which contains more than five pulses. This number of signals is selected to be the same number in N-count multivibrator 33 of FIG. 6. The number is more or less arbitrary and could be greater or lower depending upon the particular system involved. The cycle time of decision circuit 16 is sufficiently long to receive the 44 signals contained in converter 15 which stores the outputs of the periphery of network 14 and transmits the pulses in serial fashion along line 59 to logic circuit 16. Thus, a CLOCK SET line is provided at latch 36 to reset circuit 16 after 44 cycles. As with the clock of logic circuit 18 the system clock operates at a 1 MHz rate and converter 15 operates at a 44 MHz rate.

The quadrant identification function is performed by detector 98, counter 100 and decoder 101. Simultaneous signals received from detector 98 and decoder 101 at one of the four AND gates denoted by numeral 102 generate a signal indicative of the quadrant in which the split is located on one of lines T, S, R, or Q.

The operation of SPLIT decision circuit 16 is illustrated by way of example in FIG. 9. Nodes E, F, G, and H correspond to nodes A, B, C and D or the circuit in FIG. 6 annd their associated circuits function in the same fashion. Node 1 at the output of leading edge detector 98 generates a pulse in response to the first of the pulse group of logical 1 signals received from converter 15. Divide-by-11 counter 100 generates an output to decoder 101 after each 11 signals from the 44 MHz clock. Thus the output of decoder 101 at nodes J, K, L and P define a particular one of the four sides or quadrants of the periphery of network 14. The coincidence of a signal at node 1 and output from decoder 101 gates one of the AND circuits 102 and thereby identifies the particular quadrant at which the split is located.

FIG. 9 illustrates two distinct cycles, each of which are one microsecond in length and each of which is divided into 44 subcycles controlled by the 44 MHz clock. In the first cycle a group of signals containing seven pulses is received from converter 15. As it is desired to ignore more than five pulses in any group, M-count multivibrator 93 is set to $M=5$. Upon the receipt of a first pulse in the group, multivibrator 93 generates five pulses, irrespective of the number of pulses in the group at node E. Inverter 94 inverts the signal from multivibrator 93 as shown at node F. Because the group of pulses contains seven pulses which is two more than the maximum allowed, there is a coincidence of logical 1 signals at AND gate 95, resulting in a positive pulse at node G. Latch 96 is set to a logical 1 level, which is inverted by inverter 37 to a logical 0. This causes the output from AND gate 99 to become a logical 0 during the one microsecond clock cycle. This causes the output on line 80 to AND gate 21 to be a logical 0, resulting in the rejection of the false impression of a split in a bifurcation.

During the operation of this first cycle an output pulse from leading edge detector 98 at node 1 coincides with the one-fourth microsecond pulse (11 subcycles) at node K from decoder 101 to generate an output pulse at line R. This pulse is transmitted via cable 79 to coordinate discriminator 19, the operation of which will be described more fully in a later section of this specification.

FIG. 9 also illustrates a second one microsecond interval in which a pulse group of four pulses is received from coverter 15 wich results in the generation of a positive output on line 80 to AND gate 21 and a second pulse on line R to discriminator 19. A more detailed description of this cycle is considered to be unnecessary to those who have read the preceding sections of this specification.

Figure 10:
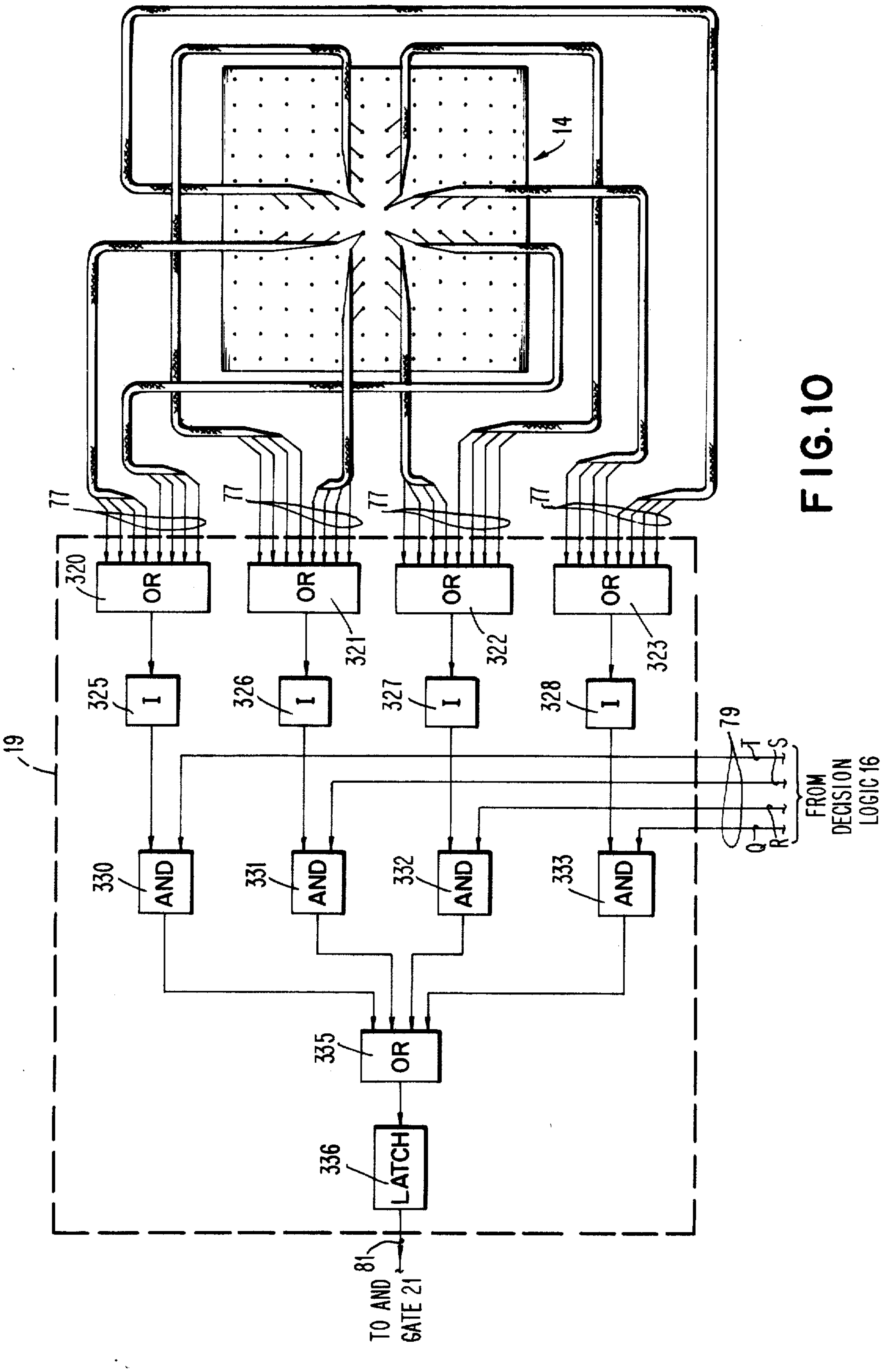
FIG. 10 is a detailed diagram of coordinate discriminator 19 illustrated in FIG. 1 and its connection to selected points in continuity logic network 14.

FIG. 10 above shows the operative relationship between network 14 and discriminator 19. Discriminator 19 functions to insure that a particular bifurcation will be detached in the system only once. Without discriminator 19 the same bifurcation could generate more than one signal from AND gate 21. In general, the continuity logic network operates during each successive scanning interval to generate a signal if the requisites of a bifurcation are met, i.e. three individual paths between the source +V and the periphery of the matrix. It will often happen that the bifurcation will be detected during a number of different scanning intervals due to the nature of the bifurcation signal itself.

Referring specifically to FIG. 10, selected circuits of network 14 have outputs connected through cable 77 to OR gates which operate as inputs to discriminator 19. The outputs on cable 77 emanate from the AND gates of the circiuts and are in addition to the outputs of the network previously described. These output lines form a cross pattern about the voltage source +V at the center of matrix 14 and, in conjunction with discriminator 19, function to block the recognition of a split in the bifurcation more than once.

The output pattern is divided into two separate columns and rows, each of which is connected to an individual one of OR gates 320–323. The outputs of the OR gates are connected to inverters 325–328, respecitively. AND gates 330–333 function respectively. gate a signal from its associated inverter when a quadrant detect signal is received from logic circuit 16 on cabling 79. An output signal from one of the AND gates is fed to latch 336 where it is held in the logical 1 position and AND at ABD gate 21 in combination with the signals from logic circuits 16 and 18.

Figure 11A:
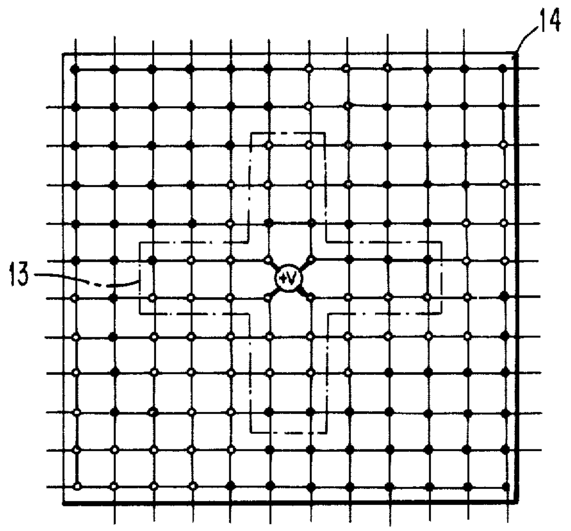
FIGS. 11*a* – 11*c* illustrate the operation of coordinate discriminator 19.
Figure 11B:
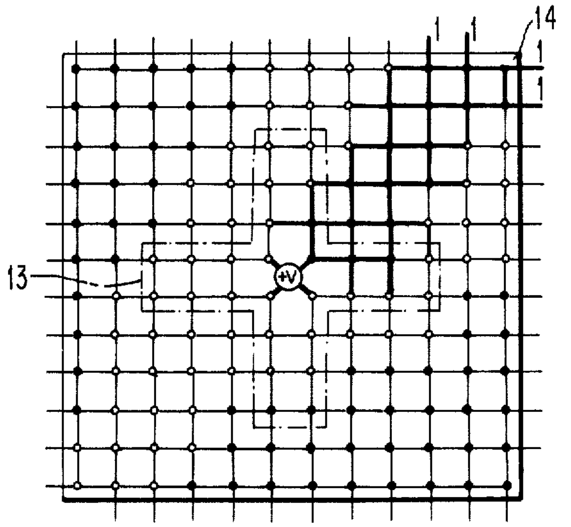
Figure 11C:
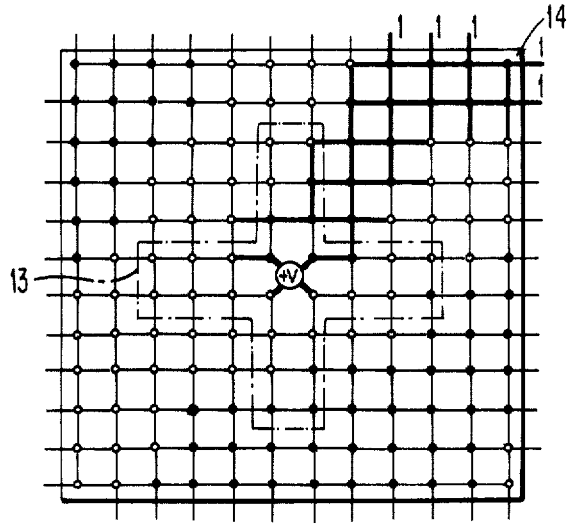

The operation of discriminator 19 can best be appreciated by referring to FIGS. 11*a* , 11*b*,11*c*, in conjunction with FIG. 10.

The figures illustrate the appearance of a split in the bifurcation at succeeding scan intervals on a network 14. The cross pattern formed by the outputs to discriminator 19 is shown in dotted lines by numeral 13. It will be recalled at this point that the TV raster encompasses 350 dots and temporary memory 8 in FIG. 1 comprises 12 shift registers of 350 bits in length. Thus each scanning interval is 350 microseconds.

In FIG. 11*a* a split in bifurcation appears at the upper right hand corner of network 14 as illustrated by the filled in dots. However, the split is not detected at this point because there is not connection between potential source +V at the center of network 14 to the inputs received from shift registers 9. For a split to be detected, at least one of the matrix points adjacent to source +V must be energized by a signal from its associated location in shift register 9.

In FIG. 11*b* the inputs from shift register 9 have been displaced one column to the left of the matrix; and the presence of the split is indicated by the logical 1 signals at the outputs on the upper right hand portion of network 14. Because the number of logical 1 s in that group does not exceed five, the presence of the split will be indicated by an output from split decision logic circuits 16 along line 80 and AND gate 21 (FIG. 1). Logic circuit 16 also indicates to discriminator circuit 19 that the split is located in the upper portion of matrix 14 by gating AND gate 332 on line R of cable 79. Simultaneously OR gates 323 and 321 are activated because of the signals at their corresponding circuit locations in matrix 14. OR gates 320 and 322 are held at a 0 level because there is no signal at their column and row outputs. The positive signals at gates 321 and 323 are inverted by inverters 326 and 328 respectively to zero and the zero outputs from OR gates 320 and 322 are inverted to logical 1 signals. Because an indication of a shift has been received at AND gate 332 on line R the signal from inverter 327 is gated through AND gate 332 through OR gate 335 to actuate latch 336 to a logical 1 output. Thus, at this point AND gate 21 receives an indication of a bifurcation from discriminator 19 as well as from logic circuit 16.

In FIG. 11*c* during the succeeding scanning interval the same split is superimposed on network 14 as indicated by the logical 1 outputs at the upper right hand portion of the matrix. However, the pattern at outputs to coordinate discriminator 19 serves to block recognition of this split, because the output of OR gate 322 becomes a logical 1. This signal is inverted to a logical O in inverter 327 and prevents the operation of AND gate 332. The split signals are shifted one column position in FIG. 11*c* from that in FIG. 11*b*. Thus, OR gate 322, which in the previous scan was not activated, is now activated to generate a 1 output to inverter 327. Inverter 327 generates an O output to AND gate 332. Thus the signal on line R is not gated through gate 322 and the output from discriminator 19 is at a logical 0 level. This operation occurs irrespective of the quadrant on the matrix in which the split occurs due to the symmetry of pattern 13 and the circuits in discriminator 19.

In summary, we have invented a system which is capable of identifying the merger of lines. The specific embodiment described is for detecting bifurcations in fingerprints and is compatible with overall fingerprint identification or verification networks which involve central processing and storage units and data communication lines. The system features a novel continuity logic network as well as other novel decision circuits. The basic building blocks of the logic network and circuits are constructed from commercially available components many of which are presently available in integrated circuit form for ease of fabrication, reliability and relatively low cost.

As previously noted, the system is also adaptable for recognizing ridge endings as well as bifurcations. Ridge endings appear to the system as the negative of a bifurcation. Therefore, in adapting the system for this purpose, it is necessary only that the binary signals be inverted before being processed, for example, between digitizer 5 and memory 8 in FIG. 1.

Although the invention has been described with a certain degree of particularity, it is understood that the present disclosure has been made only by way of example and that numerous changes in the details of construction, the combination and arrangement of parts, may be made without departing from the spirit and the scope of the invention as hereinafter claimed.

What is claimed is:

1. A system for recognizing the merger of two lines in a pattern consisting of lines and spaces between lines comprising:

scanning means for scanning said pattern and having a scanning output;

means for converting the output of said scanning means into binary signals representative of the contrast between said lines and said spaces; and continuity logic means for forming conductive paths corresponding to the contrast between said lines and spaces including:

a matrix of logic elements;

a source of a continuity signal;

each said logic element in said matrix generating an output signal to the inputs of the logic elements located adjacent and orthogonal thereto in response to the combination of a binary signal from said scanning means and said continuity signal;

said continuity signal source being directly connected only to the inputs of a first set of logic elements in said matrix;

whereby said continuity signal source is electrically connected to the inputs of the logic elements outside of said first set only when at least one of said first set of logic elements generates an output signal; and means connected to the outputs of a second selected set of logic elements in said matrix and responsive to conductive paths between said continuity signal source and the logic elements in said second set for providing an indication of a merger of two lines.

2. A system as in claim 1 wherein said second selected set of logic elements are the logic elements which comprise the periphery of said matrix.

3. A system as in claim 2 wherein each said logic element comprises:

OR circuit means responsive to a signal from logic elements located adjacent and orthogonal to said each logic element in said matrix; and AND circuit means, responsive to a signal from said OR circuit means and to a binary signal from said converting means to cause said each logic element to be in an operated condition, for generating an output signal which activates the OR circuit means of each of said adjacent, orthogonally located logic elements;

whereby said conductive paths are formed between said continuity signal source and the periphery of said matrix by said operated logic elements.

4. A system as in claim 3 wherein said first selected set of logic elements comprise four logic elements which are located at the center of said matrix.

5. A system as in claim 3 wherein each said logic element comprises:

a set of field effect transistors;

the gates of said transistors being connected in common to said binary signal received from said conversion means; and the sources of said transistors being both the inputs of said OR gate and the outputs of said AND gate.

6. A system as in claim 2 wherein said merger indication means comprises:

means for detecting the existence of three groups of binary signals from said periphery.

7. A system as in claim 6 wherein said indication means further comprises:

means for rejecting an indication of a merger if one of said groups contains more than a predetermined number of signals.

8. A system as in claim 1 further comprising:

means for inverting the polarity of said binary signals and having an output;

second continuity logic means including a matrix of logic elements operative in response to said inverted binary signals for forming conductive paths corresponding to the contrast between said lines and spaces; and means connected to the outputs of selected logic elements of said second continuity logic means and responsive to said conductive paths for providing an indication of a split between two merged lines.

9. A system as in claim 8 wherein said split indication means comprises:

means for detecting the existence of a single group of binary signals from the logic elements which comprise the periphery of said matrix of said second continuity logic means.

10. A system as in claim 9 wherein said indication means further comprises:

means for rejecting an indication of a split if said group contains more than a predetermined number of signals.

11. A system for recognizing the merger of two lines in a pattern consisting of lines and spaces between lines comprising:

scanning means for scanning said pattern and having a scanning output;

means for converting the output of said scanning means into binary signals representative of the contrast between said lines and said spaces;

means for inverting the polarity of said binary signals;

first continuity logic means responsive to said inverted binary signals for detecting the three-line pattern indicative of the merger of two lines;

second continuity logic means responsive to said binary signals for detecting the space between said merged lines;

said first and second continuity logic means each comprising:

a matrix of logic elements; and a source of potential;

each of said logic elements having an output which is energizable by the combination of a binary signal received from said converting means and said source of potential;

first decision means connected to the outputs of the logic elements located on the periphery of the matrix of said first continuity logic means for signalling the existence of said three-line pattern; and second decision means connected to the outputs of the logic elements located on the periphery of the matrix of said second continuity logic means for signalling the existence of said space between said merged lines.

12. A system as in claim 11 wherein:

said first decision means further comprise means for suppressing said three-line pattern signal if any one of said lines exceeds a predetermined width; and said second decision means further comprise means for suppressing said space signal if said space exceeds a predetermined width.

13. A system for recognizing the merger of two lines in a pattern consisting of lines and spaces between lines comprising:

scanning means for scanning said pattern and having a scanning output;

means for converting the output of said scanning means into binary signals representative of the contrast between said lines and said spaces;

means for inverting the polarity of said binary signals;

first continuity logic means responsive to said inverted binary signals for detecting the three-line pattern indicative of the merger of two lines;

second continuity logic means responsive to said binary signals for detecting the space between said merged lines;

said first and second continuity logic means each comprising:

a matrix of logic elements; and a source of potential;

each of said logic elements being energizable by the combination of a binary signal received from said converting means and said source of potential;

each said source of potential being directly connected to four logic elements which are located at the center of its associated matrix.

14. A system for recognizing minutiae in a fingerprint comprising:

means for sensing selected areas of said fingerprint and having an output for generating binary signals representative of the contrast between ridges and valleys in said fingerprint;

continuity logic means responsive to said sensing output for forming conductive paths corresponding to the contrast between ridges and valleys including:

a matrix of logic elements;

a source of a continuity signal;

each said logic element in said matrix generating an output signal to the inputs of the logic elements located adjacent and orthogonal thereto in response to the combination of a binary signal from said sensing means and said continuity signal;

said continuity signal source being directly connected only to the inputs of a first set of logic elements in said matrix;

whereby said continuity signal source is electrically connected to the inputs of the logic elements outside said first set when at least one of said first set of logic elements generates an output signal; and means connected to the outputs of a second selected set of logic elements in said matrix and responsive to conductive paths between said continuity signal source and the logic elements in said second set for providing an indication of a minutia.

15. A system as in claim 14 wherein said second selected set of logic elements are the logic elements which comprise the periphery of said matrix.

16. A system as in claim 15 wherein each said logic element comprises:

OR circuit means responsive to a signal from logic elements located adjacent and orthogonal to said each element in said matrix; and AND circuit means, responsive to a signal from said OR circuit means and to a binary signal from said sensing means to cause said each logic element to be in an operated condition, for generating an output signal which actuates the OR circuit means of each of said adjacent, orthogonally located logic elements;

whereby said conductive paths are formed between said continuity signal source and the periphery of said matrix by said operated logic elements.

17. A system as in claim 16 wherein said first selected set of logic elements comprise four logic elements which are located at the center of said matrix.

18. A system as in claim 16 wherein each said logic element comprises:

a set of field effect transistors;

the gates of said transistors being connected in common to said binary signal received from said sensing means; and the sources of said transistors being both the inputs of said OR gate and the outputs of said AND gate.

19. A system as in claim 15 wherein said minutia indication means comprises:

means for detecting the existence of a single group of binary signals from said periphery.

20. A system as in claim 19 wherein said indication means further comprises:

means for rejecting an indication of a minutia if said group contains more than a predetermined number of signals.

21. A system as in claim 14 further comprising:

means for inverting the polarity of said binary signals and having an output;

second continuity logic means including a matrix of logic elements operative in response to said inverted binary signals for forming conductive paths corresponding to the contrast between ridges and valleys; and means connected to the outputs of selected logic elements of said second continuity logic means and responsive to said conductive paths for providing an indication of a bifurcation in a minutia.

22. A system as in claim 21 wherein said bifurcation indication means comprises:

means for detecting the existence of three groups of binary signals from the logic elements which comprise the periphery of said matrix of said second continuity logic means.

23. A system as in claim 22 wherein said indication means further comprises:

means for rejecting an indication of a bifurcation if one of said groups contains more than a predetermined number of signals.

24. A continuity logic network adapted to generate indications of patterns of binary signals impressed thereon comprising:

a matrix of logic circuits, each said circuit including an AND gate and an OR gate said AND gate having a first input from the output of said OR gate;

the inputs of each said OR gate connected to the outputs of the AND gates of circuits located adjacent and orthogonally with respect to said each circuit;

the output of said AND gate in each circuit being connected to the input of the OR gate of each of the circuits located adjacent and orthogonally with respect to said circuit;

each said AND gate having a second input responsive to an external binary signal;

each said circuit comprising a set of field effect transistors;

the gates of said transistors being connected to said external signal; and the sources of said transistors being the inputs of said OR gate and the outputs of said AND gate;

whereby each said logic circuit in said matrix generates an output signal whenever said external signal is in one binary state an at least one of said adjacent and orthogonal logic circuits is in the same binary state.

25. A continuity logic network adapted to generate indications of patterns of binary signals impressed thereon comprising:

a matrix of logic circuits, each said circuit including an AND gate and an OR gate said AND gate having a first input from said OR gate;

the inputs of each said OR gate connected to the outputs of the AND gates of circuits located adjacent and orthogonally with respect to said each circuit;

the output of said ANd gate in each circuit being connected to the input of the OR gate of each of the circuits located adjacent and orthogonally with respect to said circuit;

each said AND gate having a second input responsive to an external binary signal;

continuity signal means comprising a source of potential directly connected to the input of the OR gates of four adjacent logic circuits which are located at the center of the said matrix;

whereby each said logic circuit in said matrix generates an output signal whenever the external signal to which it is responsive is in one binary state, at least one of said adjacent and orthogonal logic circuits is in said one binary state and one of said four centrally located circuits receives an external signal in said one binary state.

26. A network as in claim 25 wherein each said circuit comprises a set of field effect transistors;

the gates of said transistors being connected to said external signal; and the sources of said transistors being the inputs of said OR gate and the outputs of said AND gate.

27. A network as in claim 26 wherein the drains of said sets of field effect transistors which comprise the peripheral circuits of said matrix function as outputs indicative of the state of continuous conductive paths from said continuity signal means to said peripheral circuits.

28. A system for recognizing the merger of two lines in a pattern consisting of lines and spaces between lines comprising:

scanning means for scanning said pattern and having a scanning output;

means for converting the output of said scanning means into binary signals representative of the contrast between said lines and said spaces;

continuity logic means for forming conductive paths corresponding to the contrast between said lines and spaces including:

a matrix of logic elements;

a source of a continuity signal;

each said logic element in said matrix generating an output signal to the inputs of predetermined other logic elements in said matrix in response to the combination of a binary signal from said scanning means and said continuity signal;

said continuity signal source being directly connected only to the inputs of a first set of logic elements in said matrix;

whereby said continuity signal source is electrically connected to the inputs of the logic elements outside of said first set only when at least one of said first set of logic elements generates an output signal; and means connected to the outputs of the logic elements located at the periphery of said matrix and responsive to conductive paths between said continuity signal source and the peripheral logic elements for providing an indication of a merger of two lines;

said merger indication means comprising means for detecting the existence of three groups of binary signals from said periphery.

29. A system as in claim 28 wherein said merger indicator means further comprises means for rejecting an indication of a merger if at least one of said groups contains more than a predetermined number of signals.

30. A system for recognizing the merger of two lines in a pattern consisting of lines and spaces between lines comprising:

scanning means for scanning said pattern and having a scanning output;

means for converting the output of said scanning means into binary signals representative of the contrast between said lines and said spaces;

means for inverting the polarity of said binary signals;

first and second continuity logic means for forming conductive paths corresponding to the contrast between said lines and spaces, each said continuity logic means including:

a matrix of logic elements;

a source of a continuity signal;

each said logic element in said first and second matrices generating an output signal to the inputs of predetermined other logic elements in said respective matrices in response to the combination of said continuity signal and a binary signal from said converting means and said inverting means, respectively;

each said continuity signal source being directly connected only to the inputs of a first set of logic elements in its associated matrix;

whereby said continuity signal source is electrically connected to the inputs of the logic elements outside of said first set only when at least one of said first set of logic elements generates an output signal;

means connected to the outputs of logic elements located at the periphery of said second continuity logic means and responsive to conductive paths between said continuity signal source of said second continuity logic means and the peripheral logic elements for providing an indication of a merger of two lines;

means connected to the outputs of logic elements located at the periphery of said first continuity logic means and responsive to conductive paths between said continuity source of said first continuity logic means and the peripheral logic elements for providing an indication of a split between two merged lines;

said split indication means comprising means for detecting the existence of a single group of binary signals from said peripheral logic elements of said second continuity logic means.

31. A system as in claim 30 wherein said split indication means further comprises:

means for rejecting an indication of a split if said group contains more than a predetermined number of signals.

32. A system for recognizing minutiae in a fingerprint comprising:

means for sensing selected areas of said fingerprint and having an output for generating binary signals representative of the contrast between ridges and valleys in said fingerprint;

continuity logic means responsive to said sensing output for forming conductive paths corresponding to the contrast between ridges and valleys including:

a matrix of logic elements;

a source of a continuity signal;

each said logic element in said matrix generating an output signal to the inputs of predetermined other logic elements in said matrix in response to the combination of a binary signal from said sensing means and said continuity signal;

said continuity signal source being directly connected only to the inputs of a first set of logic elements in said matrix;

whereby said continuity signal source is electrically connected to the inputs of the logic elements outside of said first set only when at least one of said first set of logic elements generates an output signal; and means connected to the outputs of logic elements located at the periphery of said matrix and responsive to conductive paths between said continuity signal source and the peripheral logic elements for providing an indication of a minutia;

said minutia indication means comprising means for detecting the existence of three groups of binary signals from said periphery.

33. A system as in claim 32 wherein said minutia indication means further comprises means for rejecting an indication of a minutia if at least one of said groups contains more than a predetermined number of signals.

34. A system for recognizing minutiae in a fingerprint comprising:

means for sensing selected areas of said fingerprint and having an output for generating binary signals representative of the contrast between ridges and valleys in said fingerprint;

means for inverting the polarity of said signals and having an output;

first and second continuity logic means for forming conductive paths corresponding to the contrast between said ridges and valleys, each said continuity logic means including:

a matrix of logic elements;

a source of a continuity signal;

each said logic element in said first and second matrices generating an output signal to the inputs of predetermined other logic elements in said respective matrices in response to the combination of said continuity signal and a binary signal from said sensing means and said inverting means, respectively;

each said continuity signal source being directly connected only to the inputs of a first set of logic elements in its associated matrix, whereby each said continuity signal source is electrically connected to the inputs of the logic elements outside of said first set in its respective matri only when at least one of said first set of logic elements generates an output signal; and means connected to the outputs of logic elements located at the periphery of said first continuity logic means and responsive to conductive paths between said continuity signal source of said first continuity logic means and the peripheral logic elements in said first minutia;

means connected to the outputs of logic elements located at the periphery of said second continuity logic means and responsive to conductive paths between said continuity signal source of said second continuity logic means and the peripheral logic elements in said second matrix for providing an indication of a bifurcation in a minutia;

said bifurcation indication means comprising means for detecting the existence of a three groups of binary signals from said peripheral logic elements of said second matrix.

35. A system as in claim 34 wherein said bifurcation indication means further comprises:

means for rejecting an indication of a bifurcation if at least one of said groups contains more than a predetermined number of signals.

* * * * *